United States Patent
Herbert

(10) Patent No.: US 11,533,450 B2
(45) Date of Patent: Dec. 20, 2022

(54) ANTI-PIRACY VIDEO TRANSMISSION AND DISPLAY

(71) Applicant: Comcast Cable Communications, LLC, Philadelphia, PA (US)

(72) Inventor: Michael Herbert, Deptford, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 80 days.

(21) Appl. No.: 15/714,575

(22) Filed: Sep. 25, 2017

(65) Prior Publication Data

US 2019/0098251 A1 Mar. 28, 2019

(51) Int. Cl.
| | |
|---|---|
| *H04N 5/93* | (2006.01) |
| *H04N 5/913* | (2006.01) |
| *H04N 19/467* | (2014.01) |
| *H04N 7/169* | (2011.01) |
| *H04N 21/4402* | (2011.01) |
| *H04N 5/92* | (2006.01) |

(Continued)

(52) U.S. Cl.
CPC ........... *H04N 5/913* (2013.01); *H04N 7/1696* (2013.01); *H04N 19/467* (2014.11); *H04N 21/4402* (2013.01); *G06F 16/7847* (2019.01); *H04N 19/172* (2014.11); *H04N 19/186* (2014.11); *H04N 19/85* (2014.11); *H04N 21/4627* (2013.01); *H04N 21/8352* (2013.01); *H04N 2005/91357* (2013.01); *H04N 2005/91392* (2013.01)

(58) Field of Classification Search
USPC ................................................. 386/354, 248
See application file for complete search history.

(56) References Cited

U.S. PATENT DOCUMENTS

| | | | |
|---|---|---|---|
| 4,553,176 A | 11/1985 | Mendrala | |
| 8,272,016 B2 * | 9/2012 | Nakamura | H04N 5/44543 725/134 |

(Continued)

FOREIGN PATENT DOCUMENTS

| | | |
|---|---|---|
| WO | 9005429 A1 | 5/1990 |
| WO | 0074366 A2 | 12/2000 |

OTHER PUBLICATIONS

Wikipedia Contributors, "Field-sequential color system," [Internet] Wikipedia, The Free Encyclopedia, <https://en.wikipedia.org/wiki/Field-sequential_color_system>, Aug. 21, 2017.

(Continued)

*Primary Examiner* — Nigar Chowdhury
(74) *Attorney, Agent, or Firm* — Banner & Witcoff, Ltd.

(57) ABSTRACT

Methods and systems described herein generate content that quickly cycles between different-colored frames at a rapid rate that may be imperceptible to human viewers. The human eye tends to blend nearby frames together, so that a human viewer will see a full color spectrum even though only a single color is displayed at any given time. The video display may repeatedly cycle between individual color frames, thus providing video content that appears normal to a human viewer. However, a video recording device may capture only some of the color frames. Therefore, the video recorded by video recording devices may include undesirable color flicker or other color artifacts, which may deter unauthorized copying.

24 Claims, 11 Drawing Sheets

(51) Int. Cl.
*H04N 21/8352* (2011.01)
*H04N 21/4627* (2011.01)
*G06F 16/783* (2019.01)
*H04N 19/85* (2014.01)
*H04N 19/186* (2014.01)
*H04N 19/172* (2014.01)

(56) References Cited

U.S. PATENT DOCUMENTS

| | | | | |
|---|---|---|---|---|
| 8,855,375 | B2* | 10/2014 | Macciola | H04N 1/387 |
| | | | | 382/112 |
| 9,551,789 | B2* | 1/2017 | Morscher | A61B 5/0095 |
| 10,171,849 | B1* | 1/2019 | Hwang | H04N 21/816 |
| 10,264,266 | B2* | 4/2019 | Pan | H04N 21/42202 |
| 2003/0202121 | A1* | 10/2003 | Huh | H04N 9/73 |
| | | | | 348/656 |
| 2005/0128348 | A1* | 6/2005 | Orfitelli | G09G 5/006 |
| | | | | 348/441 |
| 2006/0012598 | A1* | 1/2006 | Tsao | H04N 13/393 |
| | | | | 345/419 |
| 2010/0061707 | A1* | 3/2010 | Kosakai | H04N 7/0127 |
| | | | | 386/241 |
| 2010/0191541 | A1* | 7/2010 | Prokoski | A61B 5/0064 |
| | | | | 705/2 |
| 2010/0259474 | A1* | 10/2010 | Hildreth | G06F 3/0304 |
| | | | | 345/156 |
| 2012/0287144 | A1* | 11/2012 | Gandhi | G09G 3/2029 |
| | | | | 345/589 |
| 2013/0106923 | A1* | 5/2013 | Shields | G09G 3/3406 |
| | | | | 345/690 |
| 2013/0300948 | A1* | 11/2013 | Jannard | H04N 9/315 |
| | | | | 348/756 |
| 2014/0092998 | A1* | 4/2014 | Zhu | H04N 21/234327 |
| | | | | 375/240.29 |
| 2015/0287354 | A1* | 10/2015 | Wang | G09G 3/2051 |
| | | | | 345/598 |
| 2015/0326846 | A1* | 11/2015 | Stec | H04N 19/30 |
| | | | | 348/43 |
| 2015/0346987 | A1* | 12/2015 | Ren | G06F 16/337 |
| | | | | 345/589 |
| 2016/0037122 | A1* | 2/2016 | Nozawa | H04N 5/23293 |
| | | | | 348/231.2 |
| 2016/0163356 | A1* | 6/2016 | De Haan | H04N 21/234327 |
| | | | | 386/241 |
| 2016/0248989 | A1* | 8/2016 | Cross | H04N 21/2385 |
| 2016/0309059 | A1* | 10/2016 | Tourapis | H04N 1/6058 |
| 2016/0313821 | A1* | 10/2016 | Bui | G06F 1/1632 |
| 2016/0313842 | A1* | 10/2016 | Pacheco | G06F 3/0354 |
| 2016/0313866 | A1* | 10/2016 | Pacheco | G06F 3/0393 |
| 2016/0366444 | A1* | 12/2016 | Sullivan | H04N 19/70 |
| 2017/0048561 | A1* | 2/2017 | Oh | H04N 19/59 |
| 2017/0171576 | A1* | 6/2017 | Oh | H04L 67/02 |
| 2017/0257414 | A1* | 9/2017 | Zaletel | H04L 65/604 |
| 2017/0314731 | A1* | 11/2017 | Glaser | F16M 11/2064 |
| 2017/0339418 | A1* | 11/2017 | Ramasubramonian | H04N 19/136 |
| 2018/0053284 | A1* | 2/2018 | Rodriguez | G06T 3/0093 |
| 2018/0270467 | A1* | 9/2018 | Nadig | H04N 13/351 |
| 2018/0359420 | A1* | 12/2018 | Kuchnio | G06T 7/248 |

OTHER PUBLICATIONS

Hitachi, Ltd., Panasonic Corporation, Philips Consumer Electronics, International B.V., Silicon Image, Inc., Sony Corporation, Thomson Inc., Toshiba Corporation, "High-Definition Multimedia Interface Specification Version 1.4", Jun. 5, 2009, pp. 1-425, HDMI Licensing, LLC.

* cited by examiner

Selected Video Content 503

| Frame 1 (RGB) | Frame 2 (RGB) | Frame 3 (RGB) | Frame 4 (RGB) | Frame 5 (RGB) | Frame 6 (RGB) | ... |

Transmitted Video Content 506

| Frame 1 (Red) | Blank | Blank | Frame 4 (Red) | Frame 5 (Red) | Blank | ... | TMDS Channel 0
| Blank | Frame 2 (Green) | Blank | Frame 4 (Green) | Blank | Frame 6 (Green) | ... | TMDS Channel 1
| Blank | Blank | Frame 3 (Blue) | Frame 4 (Blue) | Blank | Blank | ... | TMDS Channel 2

T1　T2　T3　T4　T5　T6　T7　T8　time

Color-Cycled Content 505

| Frame 1 (Red) | Frame 2 (Green) | Frame 3 (Blue) | Frame 4 (White) | Frame 5 (Green) | Frame 6 (Blue) | ... |

Fig. 5B

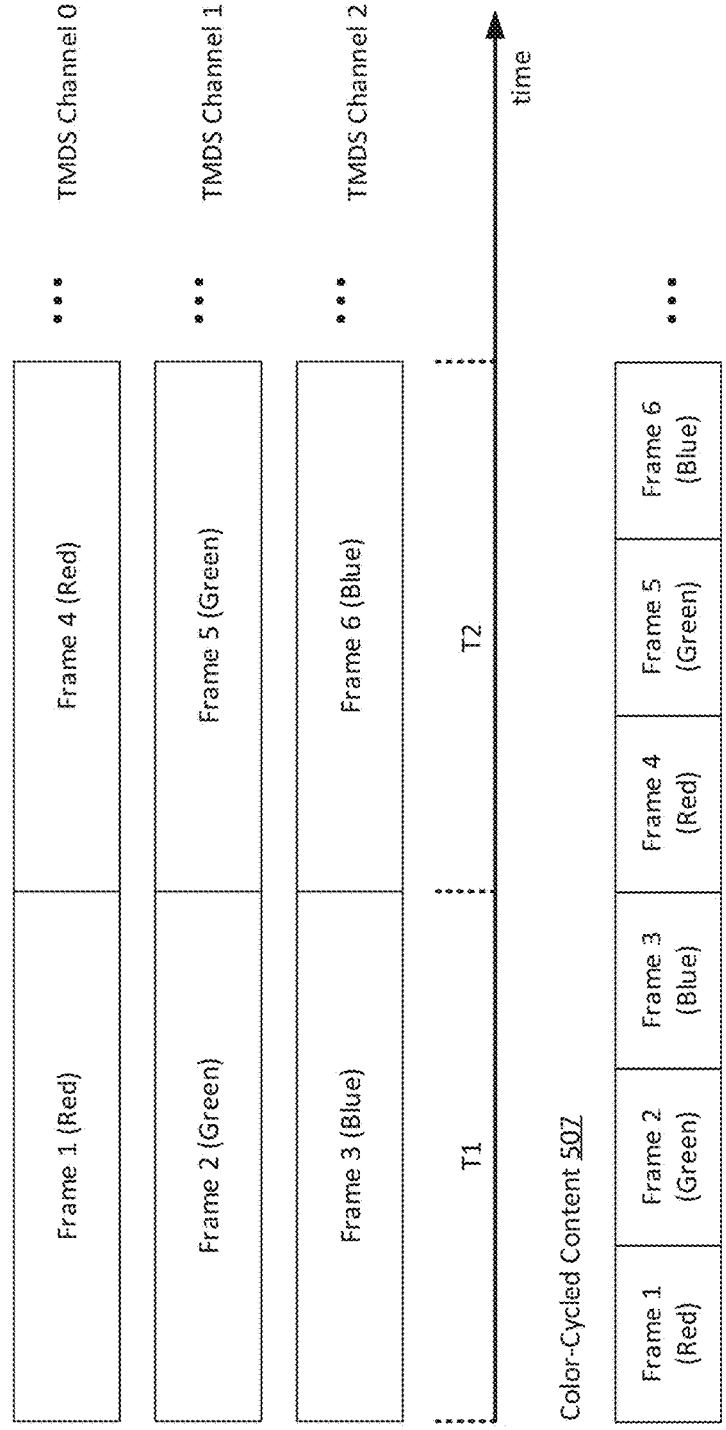

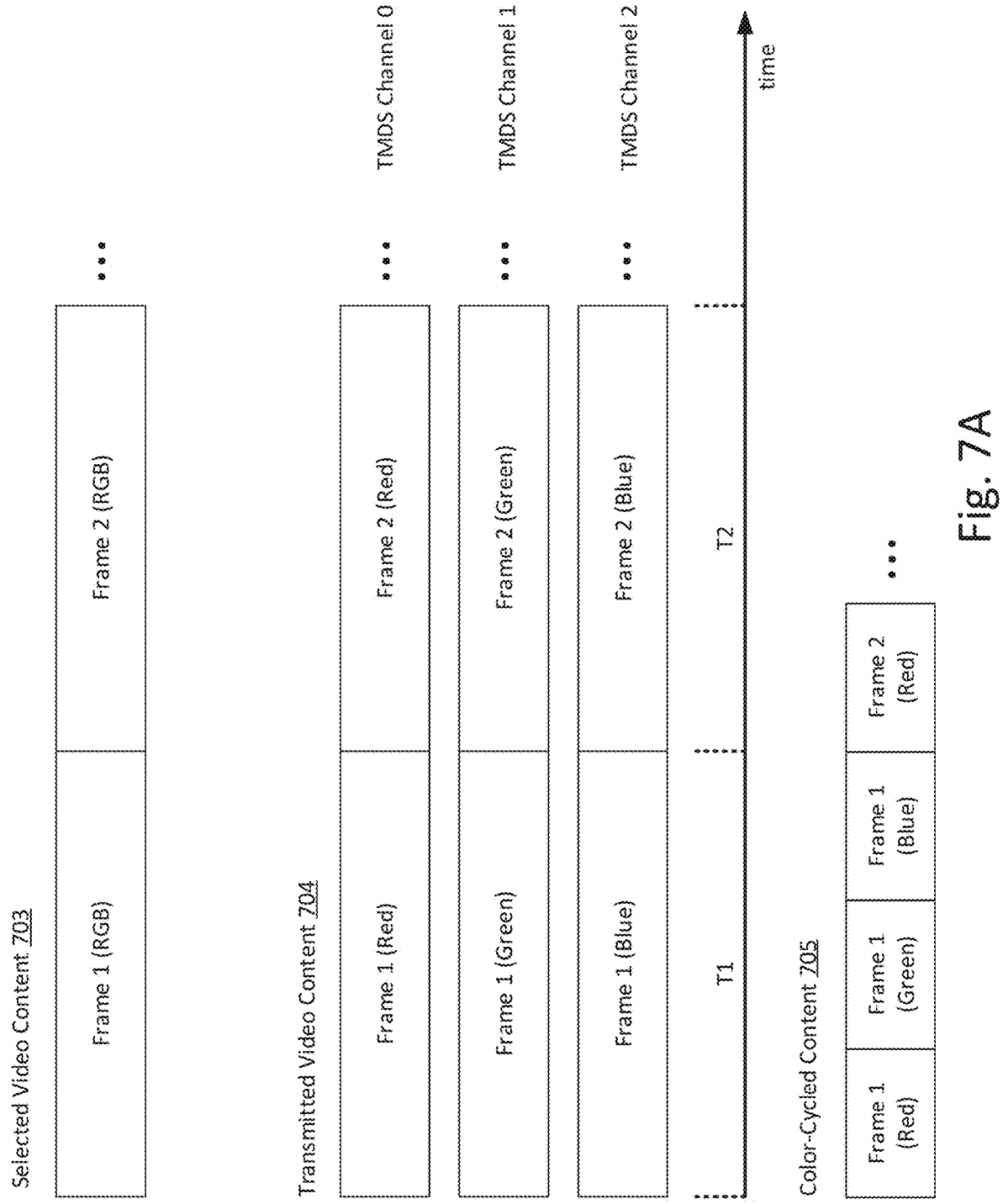

Fig. 7B

ANTI-PIRACY VIDEO TRANSMISSION AND DISPLAY

BACKGROUND

Video content rights holders commonly use digital rights management software, secure devices, and other strategies to prevent unauthorized copying and distribution of video content. However, unauthorized copies of video content can still be made by using video recording devices to capture content being output by video displays. There remains an ever-present need for protecting the rights of content holders, and for countering the efforts of those would seek to make unauthorized copies of video content.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects of this disclosure relate to methods, systems and computing devices that prevent or interfere with video capture of content displayed on a video display, such as a television, monitor, projection screen, or other video display. Video capturing devices, such as camcorders, commonly have fairly low capture rates (e.g., 20 frames per second), whereas many video displays are capable of outputting content at much higher refresh rates (e.g., 120-240 frames per second). This refresh rate disparity can be used to display content that appears normal to a human viewer, but that is difficult or impossible to accurately capture with common video recording devices.

In one aspect, techniques described herein generate content for display that quickly cycles between different-colored frames at a rapid rate that may be imperceptible to human viewers. For example, a video display may output a first frame colored in shades of a first primary color (e.g., a frame with only red image data), followed by a second frame colored in shades of a second primary color (e.g., a frame with only green image data), followed by a third frame colored in shades of a third primary color (e.g., a frame with only blue image data). The human eye tends to blend sequential frames together if they are presented in quick succession, so that a human viewer will see a full color spectrum even though only a single color is displayed at any given time. The video display may repeatedly cycle between individual color frames, thus providing video content that appears normal to a human viewer. However, a camcorder or video recording device may capture only some of the color frames. Therefore, the video recorded by video recording devices may include undesirable color flicker or other color artifacts, which may deter unauthorized copying.

In some aspects, by displaying (and potentially transmitting) a reduced amount of color information for each frame, transmitted video content may omit certain color information for any given frame and thereby use a lower bandwidth on a transmission medium. The lower bandwidth on the transmission medium may beneficially enable more robust transmission properties that may be useful when signal loss becomes an issue. Therefore, techniques described herein may be useful to combat piracy and/or to lower the bandwidth of a transmitted video signal, among other benefits.

The methods, systems and computing devices described herein may be included as part of a network, such as a cable television distribution network.

The details of these and other embodiments of the present disclosure are set forth in the accompanying drawings and the description below. Other features and advantages will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIGS. 5A, 5B, 5C, 5D are example transmission diagrams illustrating selected video content converted into transmitted video content and corresponding color-cycled content.

FIGS. 7A and 7B are example transmission diagrams illustrating selected video content converted into transmitted video content and corresponding color-cycled content.

DETAILED DESCRIPTION

Figure 1:
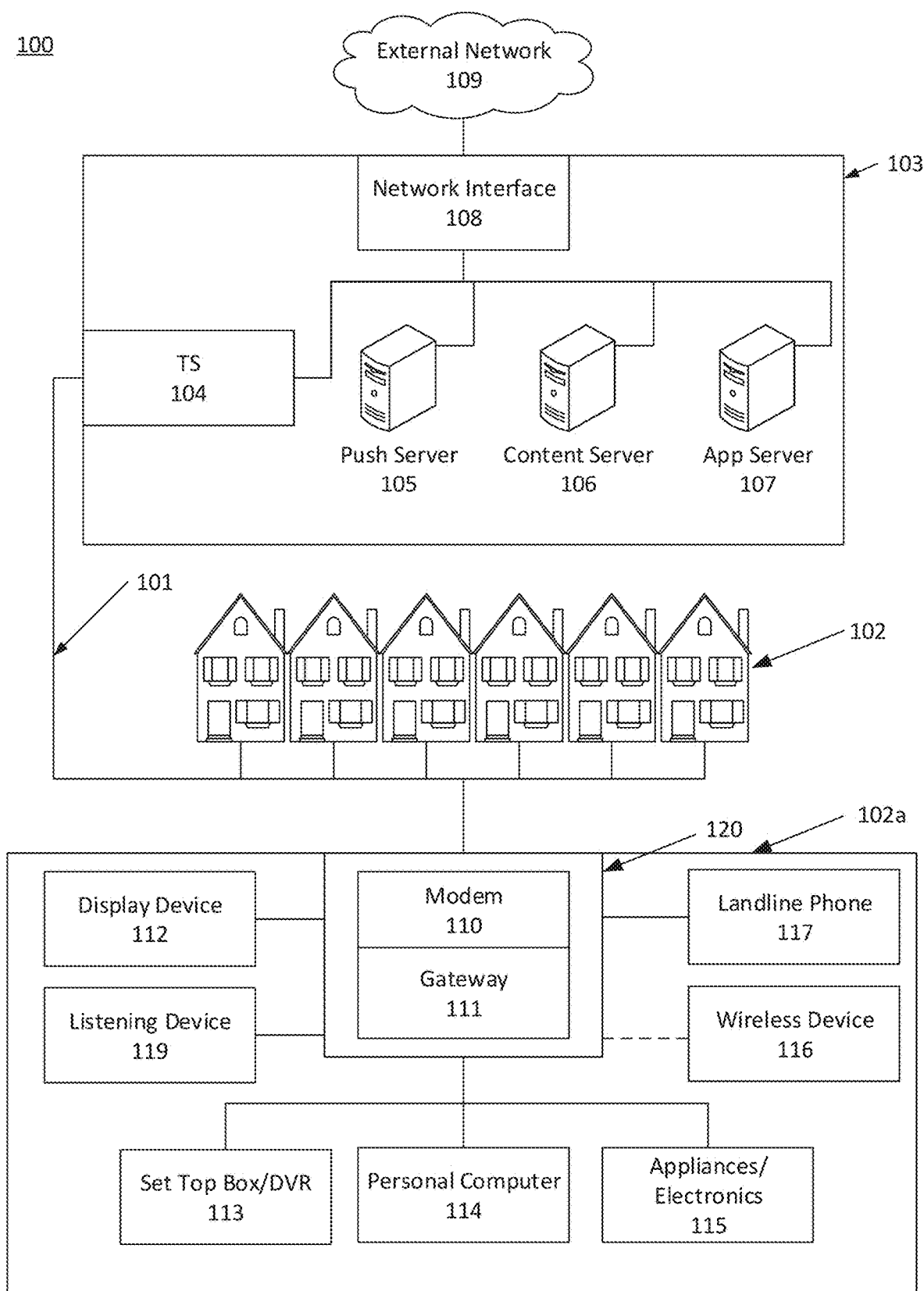
FIG. 1 illustrates an example network according to one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

A computing device with access to video content may implement techniques described herein to combat piracy by displaying video in repeating color cycles. The computing device may be part of a video distribution network, such as a cable television network, and/or may be connected to other sources of video content, such as the Internet, video players such as DVD and BLU-RAY players, and the like. Such computing systems may be part of a home entertainment system, a projection system (e.g., for a movie theater), or any other system for displaying video content.

The computing device may cause a display device to quickly display sequential frames of a video content, but to have each individual frame presented in just one color, such as a primary color, instead of as a full-color frame. In one embodiment, a cycle of frames may include a first frame of a first primary color (e.g., showing one frame of video content in red), a second frame of a second primary color (e.g., showing a next frame of video content in green), and a third frame of a third primary color (e.g., showing a next frame of video content in blue). The next cycle may similarly include three frames of three different primary colors. Various colors may be used as primary colors for a color cycle. For example, a color cycle may include a cyan frame, followed by a magenta frame, followed by a yellow frame. By quickly including individual colors in sequential frames, a human viewer's eyes may tend to blend the colors of the sequential frames, so the true full-color video content frame is still perceived over time, even though only components of a particular color are displayed in any one time.

In some embodiments, a color cycle may include a black-and-white or grayscale frame, which may beneficially increase the perceived brightness of the displayed video content. For example, a four-color cycle including a red frame, a green frame, a blue frame, and a white frame may appear brighter to a viewer than a three-color cycle including a red frame, a blue frame, and a green frame. In some embodiments, two primary colors may be used in some frames. For example, a two-color cycle may include a red-green frame, followed by a blue frame. As another example, a frame may be half one color (e.g., a top half of the frame may be red) and half another color (e.g., a bottom half of the frame may be green). In general, each frame of a color cycle may include reduced color information, and the plurality of frames forming a color cycle may collectively include a full color gamut.

In some embodiments, content may be modified before transmission over a local display link, such as a DISPLAY-PORT link, HDMI link, DVI-D link, or some other link for transmitting video data. Such links may include multiple physical channels for transmitting different video color information simultaneously. For example, HDMI includes three physical transmission minimized differential signaling (TMDS) channels for transmitting three different primary colors according to a selected color space (e.g., one channel for red data, one channel for green data, and one channel for blue data when transmitting video in the RGB color space). Additionally or alternatively, content may be transmitted across other types of links.

FIG. 1 illustrates an example network 100 on which many of the various features described herein may be implemented. Network 100 may be any type of information distribution network, such as satellite, telephone, cellular, wireless, optical fiber network, coaxial cable network, and/or a hybrid fiber/coax (HFC) distribution network. Additionally, network 100 may be a combination of networks. Network 100 may use a series of interconnected communication links 101 (e.g., coaxial cables, optical fibers, wireless, etc.) and/or some other network (e.g., the Internet, a PSTN, etc.) to connect an end-point to a local office or headend 103. Example end-points are illustrated in FIG. 1 as premises 102 (e.g., businesses, homes, consumer dwellings, etc.) The local office 103 (e.g., a data processing and/or distribution facility) may transmit information signals onto the links 101, and each premises 102 may have a receiver used to receive and process those signals.

There may be one link 101 originating from the local office 103, and it may be split a number of times to distribute the signal to various homes 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other links, or wireless communication paths.

The local office 103 may include a termination system (TS) 104, such as a cable modem termination system (CMTS) in a HFC network, a DSLAM in a DSL network, a cellular base station in a cellular network, or some other computing device configured to manage communications between devices on the network of links 101 and backend devices such as servers 105-107 (which may be physical servers and/or virtual servers, for example, in a cloud environment). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems or other user devices at the various premises 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. The servers may be physical servers and/or virtual servers. For example, the local office 103 may include a push notification server 105. The push notification server 105 may generate push notifications to deliver data and/or commands to the various homes 102 in the network (or more specifically, to the devices in the homes 102 that are configured to detect such notifications). The local office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for formatting and providing data for an interactive service being transmitted to the premises 102 (e.g., chat messaging service, etc.).

An example premises 102a may include an interface 120. The interface 120 may comprise a modem 110, which may include transmitters and receivers used to communicate on the links 101 and with the local office 103. The modem 110 may be, for example, a coaxial cable modem (for coaxial cable links 101), a fiber interface node (for fiber optic links 101), or any other desired device offering similar functionality. The interface 120 may also comprise a gateway interface device 111 or gateway. The modem 110 may be connected to, or be a part of, the gateway interface device 111. The gateway interface device 111 may be a computing device that communicates with the modem 110 to allow one or more other devices in the premises to communicate with the local office 103 and other devices beyond the local office. The gateway 111 may comprise a set-top box (STB), digital video recorder (DVR), computer server, or any other desired computing device. The gateway 111 may also include (not shown) local network interfaces to provide communication signals to devices in the premises, such as display devices 112 (e.g., televisions), additional STBs 113, personal computers 114, laptop computers 115, wireless devices 116 (wireless laptops and netbooks, mobile phones, mobile televisions, personal digital assistants (PDA), etc.), a landline phone 117, and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), BLUETOOTH® interfaces (including, for example, BLUETOOTH® LE), ZIGBEE®, and others. Premises 102a may further include one or more listening devices 119, the operation of which will be further described below.

Figure 2:
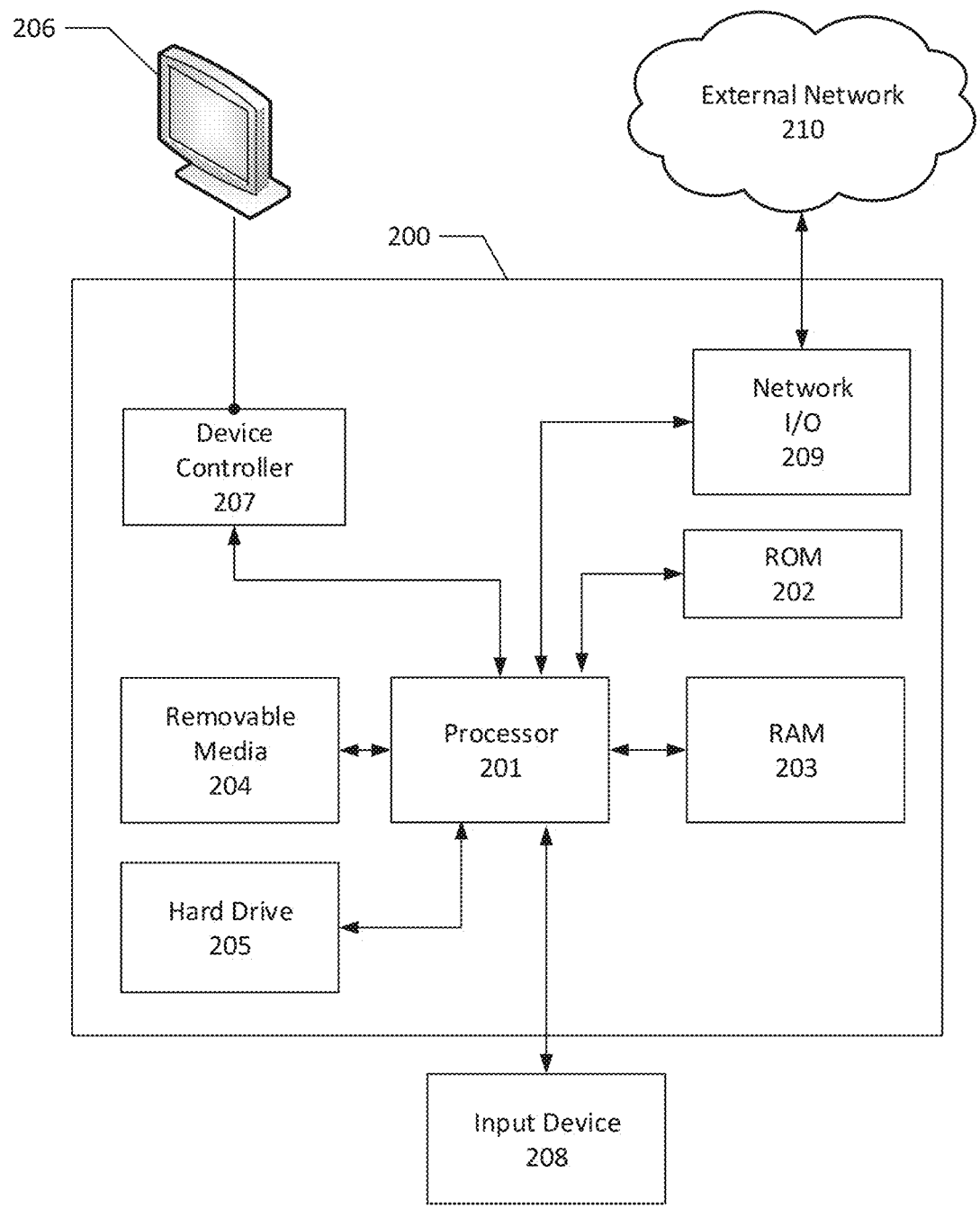
FIG. 2 illustrates an example computing device on which the various elements described herein may be implemented according to one or more aspects described herein.

FIG. 2 illustrates an example computing device on which various elements described herein can be implemented. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video controller. In some embodiments, the device controller 207 may implement an HDMI standard and/or a modified HDMI standard. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links and/or networks illustrated in FIG. 1, or any other desired network.

The FIG. 2 example is an illustrative hardware configuration. Modifications may be made to add, remove, combine, divide, etc. components as desired. Additionally, the components illustrated may be implemented using basic computing devices and components, and the same components (e.g., processor 201, storage 202, user interface, etc.) may be used to implement any of the other computing devices and components described herein.

Figure 3:
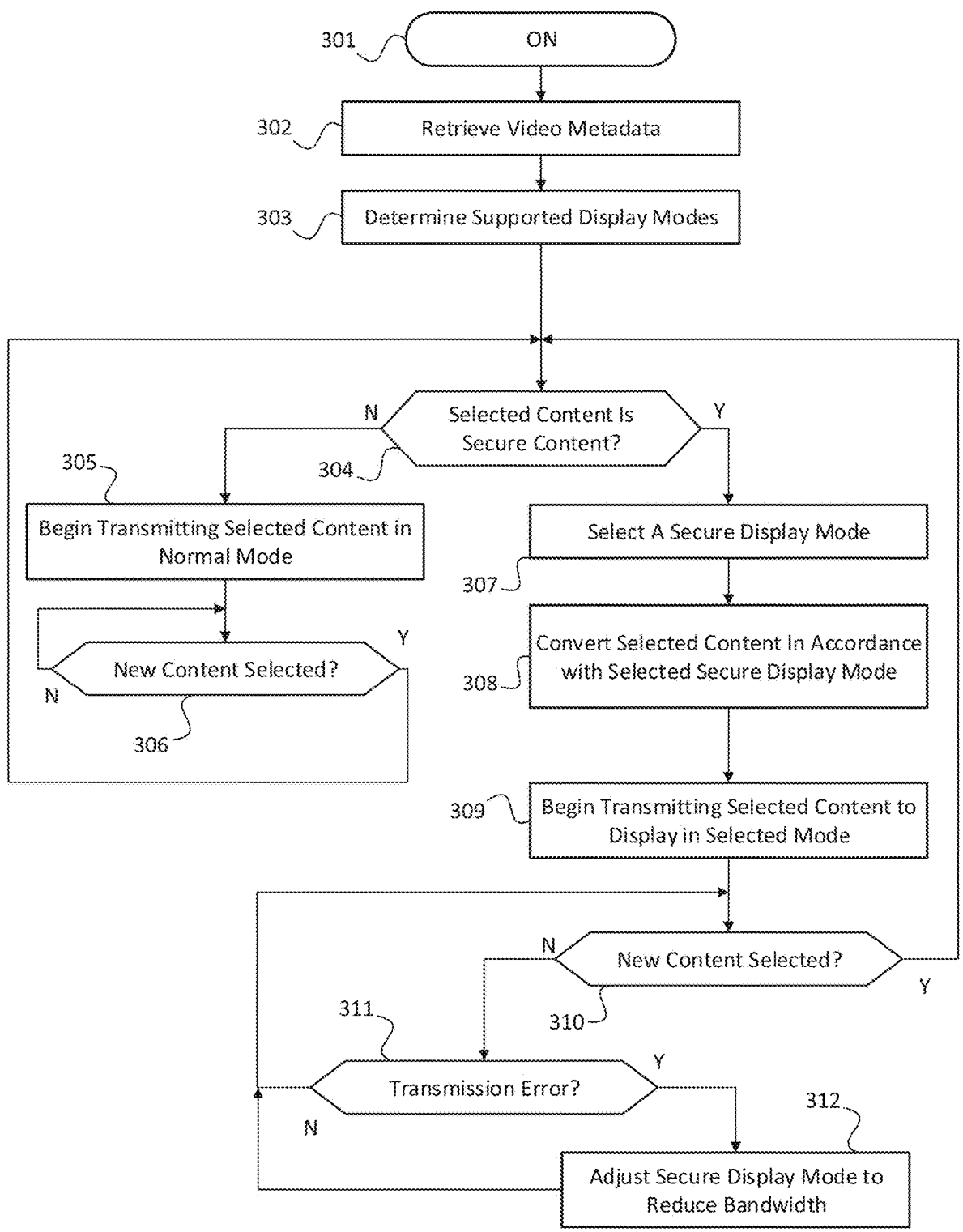
FIG. 3 illustrates an example process for causing content to be displayed according to a secure display mode.

FIG. 3 illustrates a process that may be implemented by the computing device 200, which may be a gateway 111, set top box 113, personal computer 114, or some other device. The process may begin at step 301, when the computing device 200 is turned on or otherwise begins operation of a mode for transmitting video content to a display device 206.

At step 302, a user and/or the computing device 200 may have selected video content. For example, the user may select a television program on a broadcast or on-demand channel, and/or a default or previously-selected video content may be displayed when the computing device 200 is turned on. Then, the computing device 200 may retrieve metadata that can be used to determine how the selected video content should be transmitted and displayed (e.g., using a color cycle technique) at the display device 206. The video metadata may be electronic program guide (EPG) data and/or other metadata. The video metadata may be retrieved from storage, for example, one or more of ROM 203, removable media 204, or hard drive 205. Additionally or alternatively, the video metadata may be received via a network, such as external network 210. The video metadata received from an external network 210 may be EPG data received via a television distribution network and/or via the Internet. The video metadata may also be received from a local device, such as a video game console, tablet, or other device that may communicate with computing device 200 to provide video content to display 206. Such received video metadata may be stored in the storage for later retrieval. Accordingly, at step 302, the computing device 200 may receive video metadata from another device (e.g., in response to a request transmitted to the other device) and/or retrieve the video metadata from storage.

The video metadata may contain information about video content that may be transmitted to the display device 206. The video content may include video channels (e.g., television channels), video sources (e.g., a connected device such as a video game console), or other video content assets (e.g., television episodes, movies, etc.). The video metadata may include descriptive information such as a title, genre, and summary of a particular video content asset, channel, or source. The video metadata may also include schedule information such as a time and channel of broadcast for a particular video content asset.

The video metadata may also include a security setting for each item of video content. For example, each television program on NBC may have its own security setting. The security setting may indicate that particular video content should or must be transmitted to and/or displayed by a display device 206 using a secure display mode. The security setting may be a binary setting specifying that a secure display mode is either required or not required for particular content, or it may be a setting that specifies one or more of a plurality of security settings. For example, the security setting may specify one or more parameters of a secure display mode, such as a set of allowed color cycles, a minimum display refresh rate, a maximum display refresh rate, and/or a range of allowed display refresh rates. Additionally or alternatively, the security setting may include an indication of whether the computing device 200 must transmit the video in a secure display mode, or whether the display device 206 may handle conversion to a secure display mode. In some cases, the security setting may reference a pre-defined set of parameters for a secure display mode. For example, a "high security" setting may map to a first set of parameters for a secure display mode, and a "medium security" setting may map to a second set of parameters (e.g., a more permissive set of parameters).

The video metadata may also include one or more time periods associated with a particular security setting, and may include multiple security settings for a given video content. Each of the multiple security settings may be associated with one or more time periods, or no time period. During a time period, the computing device 200 may enforce the associated security setting. Security settings with no associated time period may be enforced at any time. For example, a "high security" setting may be associated with a newly-released movie or television episode during the first 2 weeks of its initial air date, and a "medium security" setting may be associated with the same movie or episode during the following two weeks. Finally, a "low security" setting may be associated with the same movie for any other time. If no security settings are associated with video content, the computing device 200 may cause the video content to be displayed in a normal (e.g., non-secure) manner.

The video metadata may generated by and/or received from a device at the local office or headend 103. For example, one of servers 105, 106, 107 may generate the video metadata, including the security setting(s) and/or associated time periods. The server may determine that a particular video content should be associated with a security setting(s) and/or associated time periods based on a type of video content and/or an indication from a rights owner associated with the video content. For example, the server may determine that a broadcast of a new episode of a hit show should be associated with a high security setting for the first two weeks after its first broadcast, and a medium security setting for the following two weeks. Accordingly, the server may generate video metadata including appropriate security settings and time periods and transmit the video metadata to computing device 200.

At step 303, the computing device 200 may determine one or more supported display modes, which may indicate supported display refresh rates (which may affect which color cycle modes, frame rates, or other security settings are compatible with the connected display). The computing device 200 may communicate with the display 206 (e.g., via an HDMI connection) to determine one or more display modes supported by display 206. For example, the computing device 200 may receive extended display identification data (EDID) via a display data channel (DDC) of the HDMI channel. The EDID may contain information such as a maximum resolution supported by the display, a manufacturer and/or model of the display, what resolutions and corresponding refresh rates are supported by the display, and the like. In some embodiments, the EDID may further include information about specific secure display modes that are supported by the display (e.g., a "high security" mode, a "medium security" mode, and the like), and/or information about secure display mode parameters, such as supported color cycles, whether the display supports conversion into a secure display mode, and the like. Additionally or alternatively, information about supported secure display modes and/or supported parameters may be received via a Consumer Electronics Control (CEC) line, or via some other communication channel of the HDMI or other link. In cases where the display does not transmit certain information about the supported secure display modes and/or secure display mode parameters, such information may be retrieved from another device (e.g., from a remote server in communication with computing device 200) in response to a query identifying the display (e.g., by make and/or model, serial number, and/or some other identifier of the display). Additionally or alternatively, such secure display mode information may be retrieved from local storage of the computing device 200 (e.g., from a stored database comprising secure display mode information keyed to one or more display identifiers). Such secure display mode information, once received (e.g., from display device 206 and/or a remote server), may be stored by computing device 200 and reused in the future.

At step 304, the computing device 200 may determine whether a selected video content (e.g., content asset, channel, and/or content source, etc.) is associated with a security setting. The selected video content asset may be broadcast video, on-demand video, recorded video, or any other video content. Computing device 200 may determine whether the video metadata contains one or more security settings associated with content for display at display 206. Computing device 200 may further determine whether the one or more security settings are currently enforced (e.g., based on determining that the current time falls within a particular time period associated with a particular security setting). If multiple security settings are currently enforced for selected content, computing device 200 may determine which security setting takes precedence. For example, if a user selects a movie associated with a first security setting, and the movie is transmitting on a channel associated with a second security setting, the computing device 200 may select one of the first security setting or the second security setting. In some cases, the computing device 200 may determine that the more restrictive security setting (e.g., the security setting that permits fewer security modes) takes precedence. In some cases, the computing device 200 may select the most specific security setting (e.g., a security setting for a content asset over a security setting for a channel, or a security setting for a channel over a security setting for a content source).

Responsive to determining that the selected content is not secure content (e.g., based on determining that no security settings are associated with the selected content or that any security settings associated with the selected content are not currently enforced), at step 305 the computing device 200 may transmit the selected content to display 206 for display in a normal (e.g., non-secure) mode. If the computing device 200 receives a selection of new content at step 306 (e.g., because the user selects different content, the previously-selected content ends and new content begins, etc.), the computing device returns to step 304.

At step 307, responsive to determining that the selected content is secure content (e.g., based on determining at least one security setting is currently enforced), the computing device 200 may select a secure display mode to use for transmitting the content to display 206. A secure display mode may specify multiple parameters for displayed content, including a color cycle (e.g., a three-color cycle of a red, green, and blue, a four-color cycle of red, green, blue, and white, etc.), a frame rate of the displayed content, and a transmission mode. Selection of the parameters of the secure display mode may depend on one or more factors including a frame rate of the selected video content, supported refresh rates of display 206, security settings of the video metadata, and/or video conversion capabilities of the display 206, as well as other factors. FIGS. 4, 5A-5D, 6, and 7A-7B illustrate various combinations of secure display mode parameters, and the selection of such parameters based on various factors.

In some examples, the supported refresh rates of display 206 may be used to select a frame rate of transmitted or displayed content. The computing device 200 may receive a list of supported refresh rates, which may indicate a particular refresh rate (e.g., 240 Hz). The computing device may then determine a supported transmission or display frame rate for transmitted or displayed content by dividing a number of colors in a color cycle by the refresh rate (e.g., a 240 Hz refresh rate divided by 3 colors allows 80 frames per second of a first color, 80 frames per second of a second color, and 80 frames per second of a third color to be transmitted and/or displayed). This process may be repeated for each supported refresh rate of display 206. The computing device 200 may thus determine which transmission rates and/or display rates are supported based on the list of supported refresh rates received from display 206.

Figure 4:
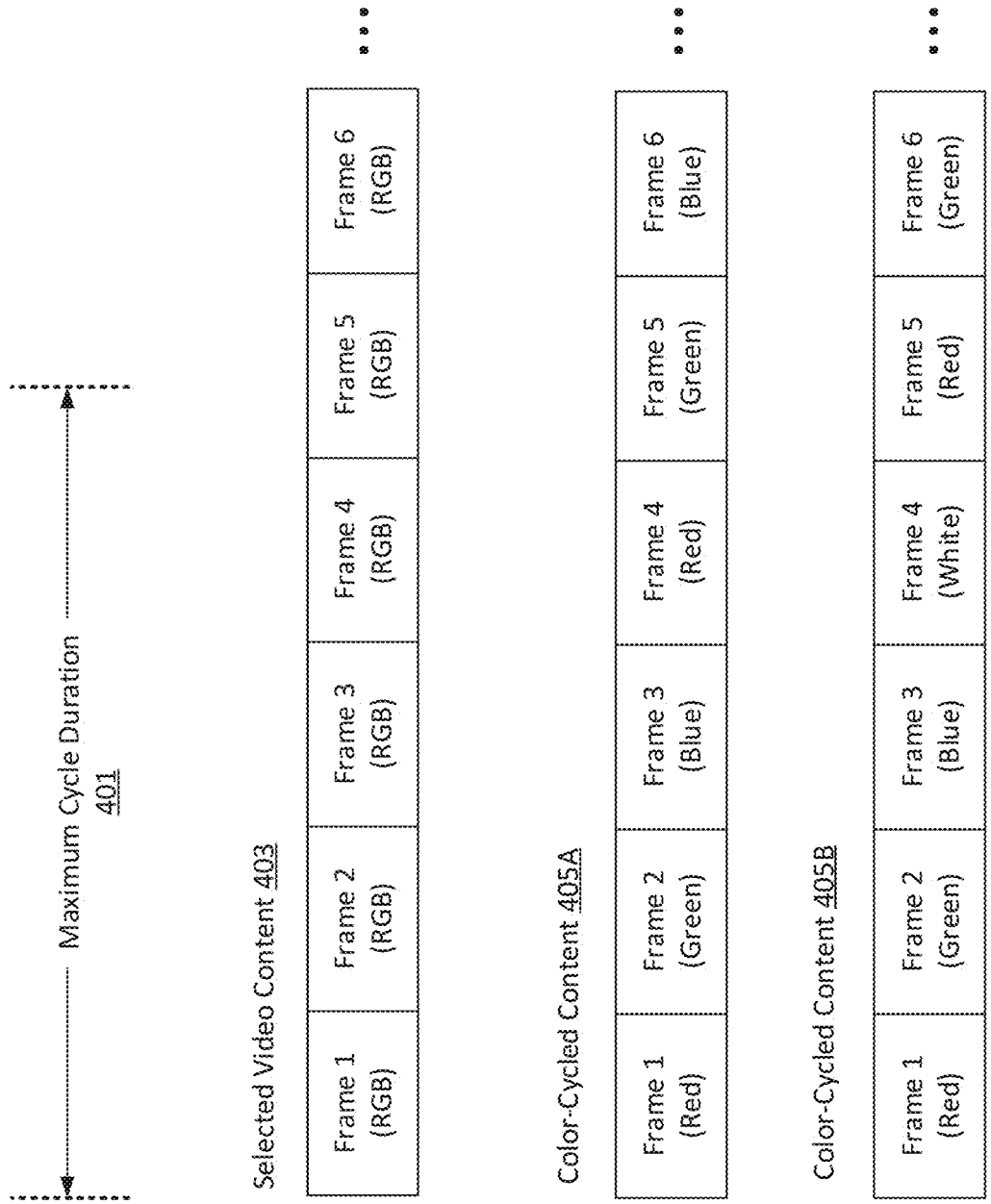
FIG. 4 illustrates an example of selected video content and corresponding color-cycled content.

The computing device 200 may further determine at least some secure display mode parameters based on a maximum cycle duration, which may indicate the maximum time for completing a color cycle that will be invisible (or at least acceptable) to a human eye. Turning to FIG. 4, a maximum cycle duration 401 is illustrated with respect to selected video content 403 of a particular frame rate. The maximum cycle duration 401 may specify a maximum time during which the display 206 must cycle through all the colors of the color cycle while displaying in a secure display mode. For example, for a maximum cycle duration 401 of 60 ms, the display must display each frame of a three-color cycle for no more than 20 ms (e.g., a red frame for 20 ms, a green frame for 20 ms, and a blue frame for 20 ms), or each frame of a four-color cycle for no more than 15 ms (e.g., a red frame for 15 ms, a green frame for 15 ms, a blue frame for 15 ms, and a white frame for 15 ms). Exceeding the maximum cycle duration 401 may cause undesirable effects for viewers, such as excessive visible flickering of content.

The frame rate of the selected video content 403 may be compared to the maximum cycle duration 401 to determine which color cycles can be completed within the maximum cycle duration 401. In the illustrated example of FIG. 4, selected video content 403 may have a relatively high frame rate in comparison to the maximum cycle duration 401. As illustrated by FIG. 4, because at least four frames of selected video content fit within the maximum cycle duration 401, selected video content 403 may be converted into, for example, color-cycled content using a three-color cycle (450A) or a four-color cycle (405B).

The selected video content 403 includes a sequence of frames for sequential display (with the first six frames illustrated). FIG. 4 shows how each frame of selected video content 403, which has full color information (e.g., red, green, and blue primary colors according to an RGB color gamut, although other color gamuts may be used), may be converted into a frame having only single color information according to a three-color cycle mode (as illustrated by color-cycled content 405A) or a four-color cycle mode (as illustrated by color-cycled content 405B). For example, according to a three-color cycle secure display mode (405A), a first frame of the selected video content 403 may be converted to a first frame of color-cycled content 405A having only the red component of the first frame of selected video content 403. Such conversion of the selected video content 403 into color-cycled content 405 may be performed by the computing device 200 and/or by the display device 206.

Figure 5A:
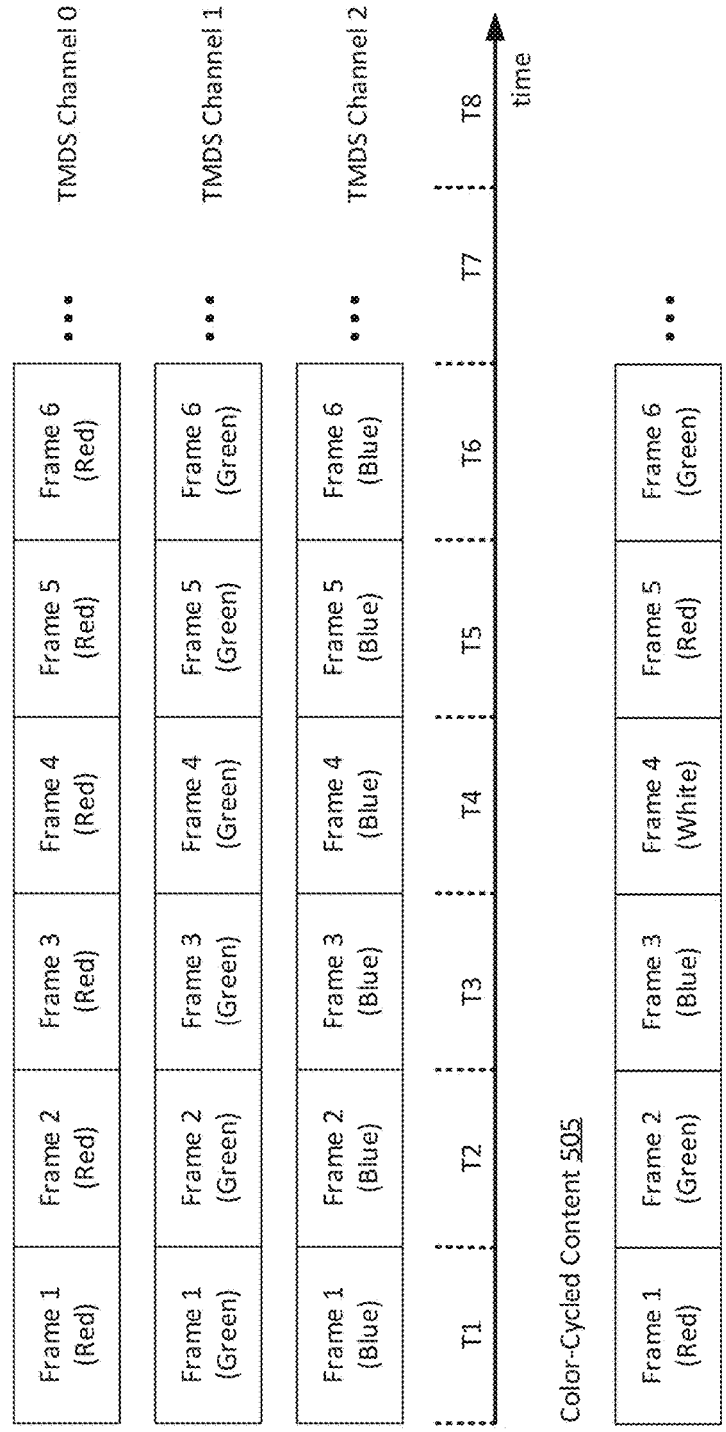

FIG. 5A illustrates transmission and display of content according to a first example secure display mode. In the illustrated secure display mode, selected video content 503 is converted to color-cycled content 505 using a four-color cycle. The selected video content 503 may be transmitted to the display device 206 using a standard transmission mode, and the display device 206 may convert the received video content to color-cycled content 505 for display. As illustrated, according to a normal transmission mode, three TMDS channels may be used to carry three color components (e.g., red, green and blue) of the original frame. For example, when frame 1 is transmitted during a first time period T1, TMDS Channel 0 may carry the red component information, TMDS Channel 1 may carry the green component information, and TMDS Channel 2 may carry the blue component information. The transmission proceeds similarly for a second frame, third frame, and so on. The display device 206, which converts the received transmitted video content 504 to color-cycled content 505, may simply discard unnecessary color information from transmitted video content 504. For example, to convert the first frame data of transmitted video content 504 to a first frame of color-cycled content 505 (e.g., to generate red frame 1 of color-cycled content 505), the display device 206 may simply discard the other color data of transmitted video content 504 (e.g., the green and blue frame 1 data of transmitted video content 504). In some cases, the display device 206 may process the received transmitted video content 504 in order to generate one or more frames of the color-cycled content 505. For example, the display device 206 may generate the illustrated white frame 4 of color-cycled content 505 by combining the red frame data, green frame data, and blue frame data of transmitted video content 504, then converting the combined data to black-and-white data (e.g., grayscale data). So, while Frames 1-4 might not each be displayed in their original full color spectrum, if those 4 color-cycled sequential frames are displayed quickly enough, the human eye might not notice the difference, but a camcorder or smartphone camera might capture the individual colors in some or all of the frames.

In the above example, some of the frame data transmitted on the TMDS Channels are not actually used. For example, for Frame 1, which is displayed in red in the color-cycled content 505, the transmission of the blue and green components of Frame 1 might be unnecessary. FIG. 5B illustrates transmission and display of video content according to a second example secure display mode, in which those unnecessary color frames are simply omitted from the TMDS Channels. In the illustrated second example secure display mode, the computing device 200 may avoid transmitting unnecessary data (e.g., data that would be discarded by the display device 206). For example, instead of transmitting green color data and blue color data for frame 1 of selected video content 503, the computing device 200 may instead transmit blank data indicating that a frame has no green color data or blue color data. As another example, the computing device may transmit nothing at all on the transmission channels that would normally carry the green color data and blue color data. In some cases, the computing device 200 may transmit blank data in transmitted video content 506 in order to maintain compatibility with display devices 206 that do not support conversion of transmitted video content 506 into color-cycled content 505 at the display device 206. However, in some cases (e.g., if the display device 206 supports such a setting), the computing device 200 may simply transmit nothing instead of blank data and/or may transmit other data during time periods that would otherwise contain blank data of transmitted video content 506. In some cases, computing device 200 may process the selected video content 503 before transmission. For example, the illustrated frame 4 of selected video content 503 may be converted to grayscale by computing device 200 before separation into red, green, and blue components for transmitted video content 506, in order to yield white (grayscale) frame 4 of color-cycled content 505.

In the above example, which shows a four-color cycle, each TMDS Channel only transmits information about half of the time. A three-color cycle, which omits the white frame, might transmit information in the TMDS Channels only a third of the time. In alternative embodiments, this fact may allow the TMDS Channels to transmit at a slower data rate than normal. FIG. 5C illustrates transmission and display of content according to a third example secure display mode in which a slower transmission frame rate is used. In the third example secure display mode, the frame rate of the transmitted video content 508 may be reduced in comparison to the frame rate of selected video content 503. In the illustrated example, because only one third of the color data for each frame of selected video content 503 is being transmitted as transmitted video content 508 (e.g., because in the three-color cycle, data for the other two colors is being discarded for each frame), the frame rate may be reduced by a factor of three, and three frames may be transmitted on three transmission channels in a given time period (e.g., frames 1-3 may be transmitted during a first time period, and frames 4-6 may be transmitted during a second time period, as illustrated). Thus, for example, 90 frames-per-second content may be transmitted at 30 frames-per-second by transmitting three sequential frames for display as color-cycled content 507 during the same time period.

The FIG. 5C example also shows three frames (e.g., red Frame 1, green Frame 2, and blue Frame 3) being transmitted on the TMDS Channel at the same time (e.g., time period T1). The display device 206 may receive these multiple frames of transmitted video content 508 at the same time, store some or all of them in a buffer, and cause them to be displayed sequentially as frames of color-cycled content 507 in order to present the video content in secure display mode. As illustrated by FIG. 5C (with buffering and transmission delays not shown), a first frame of the selected video content 503 may correspond to a first frame of color-cycled content 507 displayed in a first color, a second frame of the selected video content 503 may correspond to a second frame of color-cycled content 507 displayed in a second color, and so on, with colors repeating in a three-color cycle in the illustrated example.

A secure display mode that uses a reduced transmission frame rate may beneficially provide more robust transmission characteristics, due to the lower data rate. Accordingly, such a reduced transmission frame rate mode may be beneficially useful with longer transmission cables, damaged transmission cables, or to address other causes of transmission signal degradation and/or signal loss, as further discussed for steps 311 and 312 of FIG. 3.

Figure 5D:
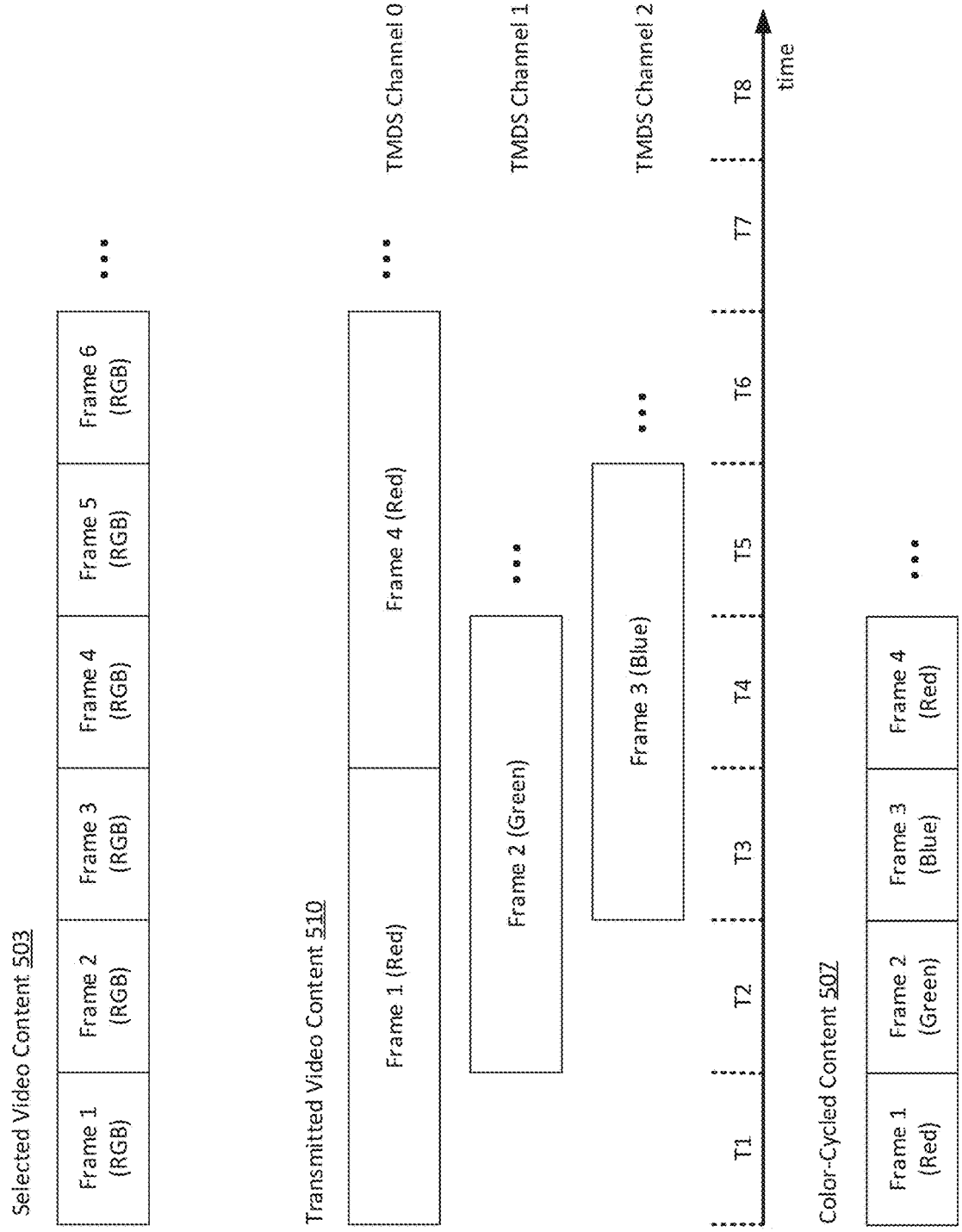

In the above example, the TMDS Channels were aligned, such that 3 frames were all received at the same time (T1), and the display device would buffer some of the frames until they were needed for display. In alternative embodiments, the frames may be staggered in the TMDS Channels to reduce the buffering requirement. FIG. 5D illustrates transmission and display of content according to a fourth example secure display mode that staggers the frames. Similarly as for the third example secure display mode, in the fourth example secure display mode, the frame rate of transmitted video content 510 may be reduced in comparison to selected video content 503. However, rather than transmitting multiple frames aligned in a single time period, the computing device 200 may transmit multiple frames in overlapping, staggered time periods. Such a transmission configuration may beneficially reduce buffering at the computing device 200 and/or at the display device 206.

The display device 206 may receive the multiple frames transmitted at overlapping, staggered times and cause them to be displayed sequentially to present the video content in secure display mode. As illustrated by FIG. 5D (with buffering and transmission delays not shown), a first frame of the selected video content 503 may correspond to a first frame of color-cycled content 507 of a first color, a second frame of the selected video content 503 may correspond to a second frame of color-cycled content 507 of a second color, and so on, with colors repeating in a three-color cycle in the illustrated example.

Figure 6:
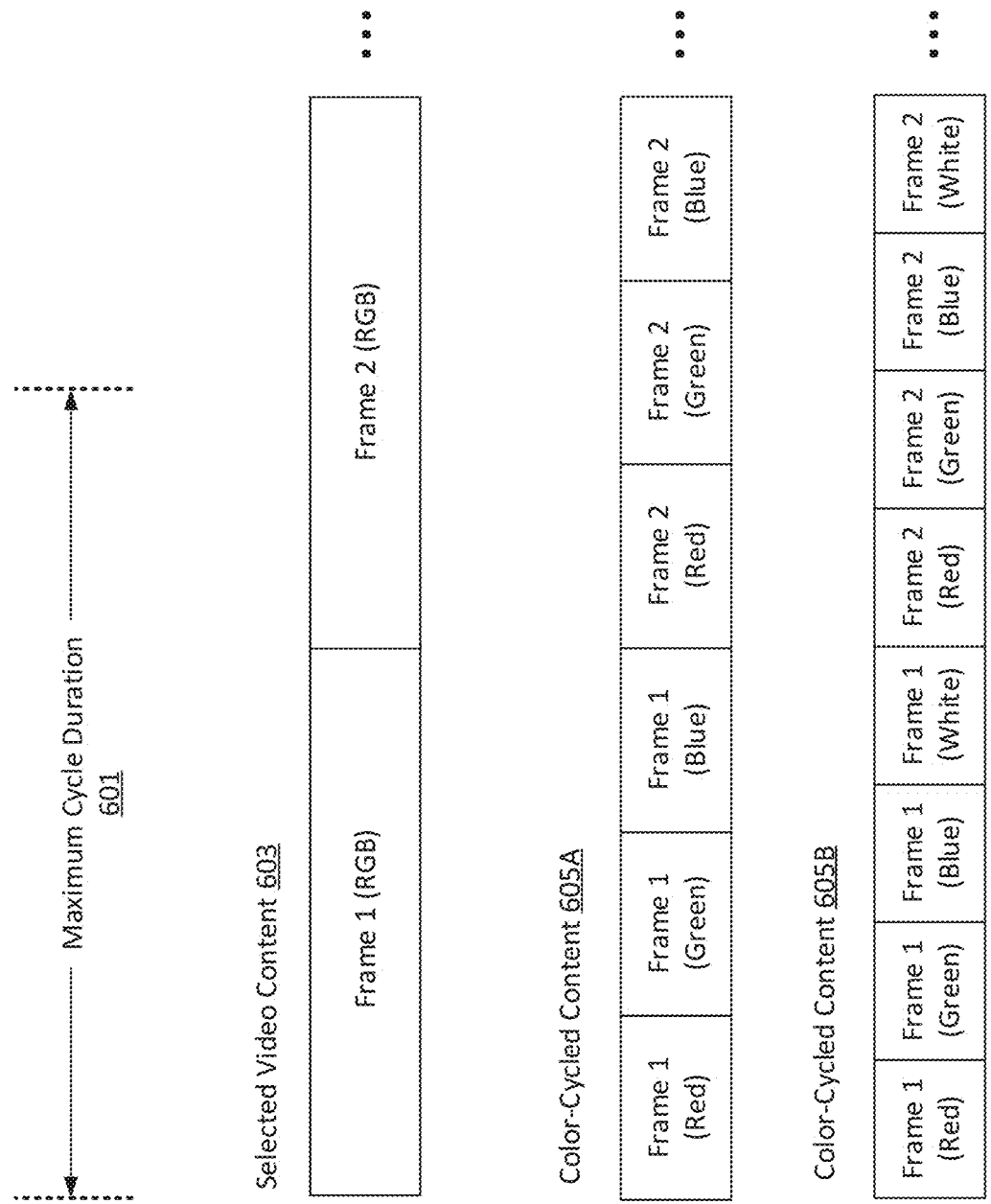
FIG. 6 illustrates an example of selected video content and corresponding color-cycled content.

FIG. 6 illustrates another case of a maximum cycle duration 601 with respect to a selected video content 603 of a particular frame rate. In this case, the relatively low frame rate of the selected video content 603 in comparison to the maximum cycle duration 601 could cause excessive visible flickering for human viewers if the frame rate is not increased for color-cycled content. The maximum cycle duration 601 thus provides a frame rate criterion (e.g., a minimum frame rate). If the frame rate criterion is not satisfied (e.g., the video content 603 has a frame rate below a minimum frame rate), the computing device 200 may select an increased frame rate security mode. In other words, compared to the selected video content 403 of FIG. 4, the selected video content 603 of FIG. 6 may comprise fewer frames per second, such that cycling colors by causing a first frame of selected video content 603 to be displayed in a first color, a second frame of selected video content 603 to be displayed in a second color, and so on, may cause the maximum cycle duration 601 to be exceeded, which may cause undesirable effects for viewers, such as visible flickering of content.

In order to convert such selected video content 603 to a secure display mode, a first frame of the selected video content 603 may be converted into multiple frames of color-cycled content 605, thereby increasing the frame rate of the color-cycled content. For example, a frame 1 of selected video content 603, which may have three color components, may be converted three sequential frames of color-cycled content 605A, each having a different color. As another example, frame 1 of selected video content 603 may be converted into four frames of color-cycled content 605B, each having a different color. Accordingly, the color-cycled content 605 may be increased in frame rate in comparison to the selected video content 603. Such conversion may be performed by the computing device 200 and/or by the display device 206.

FIG. 7A illustrates transmission and display of content according to a fifth example secure display mode that generates the increased frame rate color-cycled content 705 at the display device 206. In the fifth example secure display mode, the computing device 200 may transmit the selected video content 703 to the display 206 as transmitted video content 704 according to a normal transmission mode (e.g., at a same frame rate as the selected video content). For example, first color data, second color data, and third color data for a first frame of selected video content 703 may be transmitted together on three corresponding transmission channels as transmitted video content 704. Then, the display device 206 may sequentially display the first color data as a first frame of color-cycled content 705, followed by the second color data as a second frame of color-cycled content 705, followed by the third color data as a third frame of color-cycled content 705, and so on. In some modes, the display device may generate additional color-cycled content 705 frames based on the color data. For example, the display device 206 may generate a fourth color-cycled content frame in grayscale using the received first, second, and third color data (e.g., to generate a four-color cycle color-cycled content, such as color-cycled content 605B of FIG. 6).

Figure 7B:
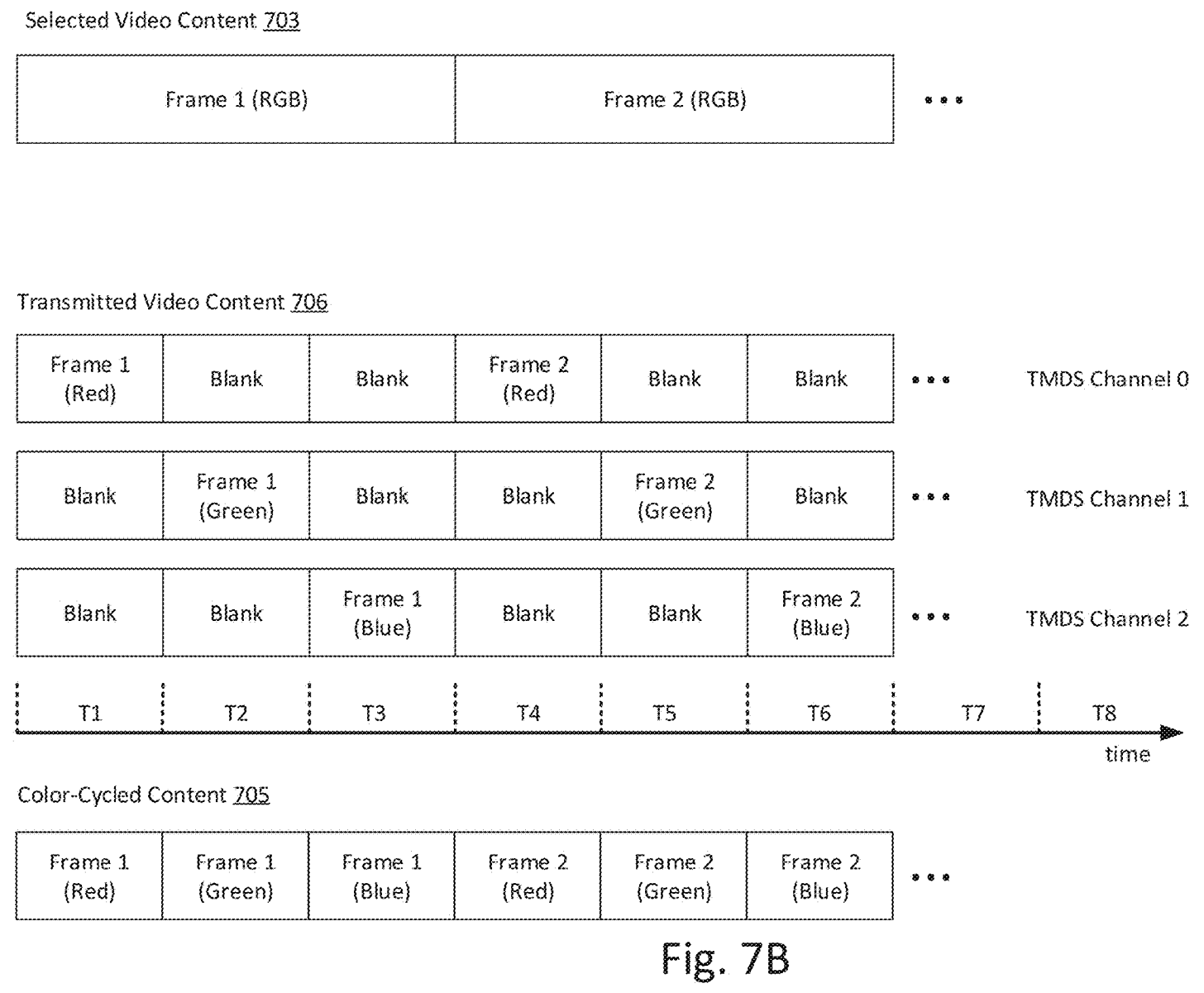

In some cases (e.g., when a display device 206 lacks the capability of generating the increased frame rate color cycle content 705), the computing device 200 may increase a frame rate of transmitted video content 706. The computing device 200 may optionally transmit blank data (e.g., during time periods when a TMDS channel does not need to carry color information for display). FIG. 7B illustrates transmission and display of content according to a sixth example secure display mode. In the sixth example secure display mode, the computing device 200 may increase a frame rate of the transmitted video content 706 as compared to the selected video content 703. For example, selected video content 703 at 30 frames per second may be transmitted as transmitted video content 706 at 90 frames per second, with each frame of selected video content 703 split into three frames of transmitted video content 706 in different colors. In another example (not illustrated), selected video content 703 at 30 frames per second may be transmitted as transmitted video content at 120 frames per second, with each frame of selected video content 703 split into four transmitted frames in different colors. As illustrated, transmitted video content 706 may include a frame for display on only a single transmission channel of multiple transmission channels at a time, and the other transmission channels may contain blank data, no data at all, or other data. For example, during time period T1, TMDS Channel 0 may carry red color information for frame 1 of transmitted video content 706, and second and third transmission channels may carry blank data (as illustrated), no data at all, or other data. The computing device 200 may transmit blank data in order to maintain compatibility with display devices 206 that do not support conversion of content at the display device 206 (e.g., for a legacy display device 206 that implements standard HDMI transmissions). In some embodiments, each transmitted video content 706 frame at the higher frame rate may be transmitted with additional error correction information as compared to a normal transmission (e.g., one or more additional error correction bits per byte as compared to an HDMI normal transmission). In some cases, computing device 200 may process the selected video content 703 before transmission. For example, a grayscale frame may be generated by computing device 200, then separated into red, green, and blue components for transmission.

Turning back to FIG. 3, at step 308, after selecting a secure display mode, the computing device 200 may convert the selected video content before transmission to the display device 206 in accordance with the selected secure display mode. According to some secure display modes, the computing device 200 may transmit the selected video content using conventional transmission methods (e.g., using standard HDMI transmissions), and the display device 206 may convert the transmitted content into color-cycled content. According to some secure display modes, the computing device 200 may replace certain color data of the selected video content with blank color data, replace certain color data with other data, and/or transmit nothing instead of transmitting certain color data. According to some secure display modes, the computing device 200 may lower the frame rate of the transmitted video content in comparison to the selected video content. According to some secure display modes, the computing device 200 may transmit multiple color-cycled content frames simultaneously and/or in overlapping time periods. According to some secure display modes, the computing device 200 may increase a frame rate of the transmitted video content in comparison to the selected video content.

At step 309, the computing device 200 may transmit the converted video content to the display device 206. The video content may be transmitted across a local video connection, such as an HDMI connection. Accordingly, the various color data may be separated and transmitted across different transmission channels of the link. For example, as illustrated in FIGS. 5A-5D, 7A, and 7B, one transmission channel may be used to carry red data, one transmission channel may be used to carry green data, and one transmission channel may be used to carry blue data. However, other colors (e.g., cyan, yellow, and magenta) or color spaces (e.g., a YCC color space including one luma channel and two chroma channels) may be used for transmission.

At step 310, if the computing device 200 receives a selection of new content (e.g., because the user selects different content, the previously-selected content ends and new content begins, etc.), the computing device returns to step 304. Otherwise, the computing device 200 may continue transmitting the selected video content.

In some cases, in response to detecting a transmission error at step 311, the computing device 200 may adjust the selected secure display mode to reduce a bandwidth of the transmission at step 312. The computing device 200 may receive an indication from the display device 206 that the display device 206 did not receive one or more frames, detected one or more errors, or otherwise received a degraded signal. Responsive to receiving the indication, at step 312, the computing device 200 may adjust one or more parameters of the secure display mode to lower a bandwidth of the transmission. For example, the computing device 200 may reduce a frame rate of the transmitted video content (e.g., as in FIG. 5C or 5D), or switch from a four-color cycle to a three-color cycle. The lower bandwidth transmission may be more robust to signal degradation.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), application-specific integrated circuits (ASIC), and the like. Particular data structures may be used to more effectively implement one or more aspects of the invention, and such data structures are contemplated within the scope of computer executable instructions and computer-usable data described herein.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or sub-combination with elements of the other examples. For example, any of the above described systems and methods or parts thereof may be combined with the other methods and systems or parts thereof described above. For example, the steps illustrated in the illustrative figures may be performed in other than the recited order, and one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method comprising:
identifying metadata associated with a plurality of video content items, wherein the metadata indicates:
that a first video content item is to be displayed using a color-cycled mode in which at least one primary color, of a plurality of primary colors, is omitted from a frame captured by a video recording device; and
that a second video content item is to be displayed without using the color-cycled mode; and
based on the metadata:
causing display of the first video content item using the color-cycled mode.

2. The method of claim 1, wherein the color-cycled mode comprises a color-cycle rate that is slower than an expected video recording device frame capture rate, and wherein the color-cycle rate indicates a rate at which a color frame is repeated during output of a plurality of frames.

3. The method of claim 1, wherein causing the display of the first video content item comprises reducing an original color cycle rate of the first video content item to be slower than an expected video recording device frame capture rate.

4. The method of claim 1, wherein causing the display of the first video content item using the color-cycled mode comprises sending, to a display device, the first video content item, wherein one or more frames of the first video content item comprises blank data in place of at least one of first primary color information, second primary color information, or third primary color information.

5. The method of claim 1, further comprising:
for a first frame of the first video content item, discarding second primary color information and third primary color information to yield a color-cycled content frame of a first primary color;
for a second frame of the first video content item, discarding first primary color information and third primary color information to yield a color-cycled content frame of a second primary color;
for a third frame of the first video content item, discarding first primary color information and second primary color information to yield a color-cycled content frame of a third primary color; and
for a fourth frame of the first video content item, adjusting first primary color information, second primary color information, and third primary color information to yield a grayscale color-cycled content frame.

6. The method of claim 1, wherein in the color-cycled mode, a time period between frames of a first primary color is longer than a time period between consecutive frames in the first video content item.

7. The method of claim 1, further comprising:
selecting, based on an expected video recording device frame capture rate, a color cycle rate, of the color-cycled mode, in which at least one primary color, of the plurality of primary colors, cycles at a rate that is slower than the expected video recording device frame capture rate.

8. The method of claim 1, wherein the metadata indicates a security setting associated with the first video content item and a time period, and wherein causing the display of the first video content item using the color-cycled mode comprises determining, based on a current time and based on the time period, that the security setting is active.

9. The method of claim 1, wherein the metadata indicates a first security setting associated with the first video content item and a second security setting associated with a channel of the first video content item, the method further comprising determining which of the first security setting or the second security setting is more restrictive.

10. The method of claim 1, wherein the metadata indicates at least one time period associated with the first video content item, and wherein causing the display of the first video content item is based on determining that a current time falls within the at least one time period.

11. The method of claim 10, wherein the metadata further indicates a second time period during which the first video content item is permitted to be displayed without using the color-cycled mode.

12. The method of claim 1, wherein causing the display of the first video content item using the color-cycled mode further comprises:
determining that the first video content item is associated with a security setting.

13. The method of claim 12, wherein the metadata further indicates one or more enforcement periods associated with the security setting.

14. The method of claim 1, wherein the metadata further indicates that different video content items, of the plurality of video content items, are to be displayed using one or more primary colors, of the plurality of primary colors, that are cycled at different rates.

15. The method of claim 1, wherein the metadata further indicates:
a first time period for displaying the first video content item using the color-cycled mode; and
a second time period for displaying the first video content item without using the color-cycled mode.

16. A system comprising:
a server; and
a computing device;
wherein the server is configured to:
determine an expected video recording device frame capture rate;
generate, based on determining that a first video content item is associated with a video capture interference mode, video metadata comprising the expected video recording device frame capture rate; and
send the video metadata to the computing device; and
wherein the computing device is configured to:
convert, based on the expected video recording device frame capture rate, the first video content item into color-cycled content comprising a color cycle rate that is less than the expected video recording device frame capture rate, wherein a time period of a full color cycle at the color cycle rate is longer than a time period between frame captures at the expected video recording device frame capture rate; and
cause display of the color-cycled content.

17. The system of claim 16, wherein, to convert the first video content item into color-cycled content, the computing device is further configured to:
generate, using first primary color information of a first frame, a first color-cycled content frame;
generate, using second primary color information of the first frame, a second color-cycled content frame; and
generate, using third primary color information of the first frame, a third color-cycled content frame.

18. The system of claim 16, wherein the color cycle rate comprises a rate at which a full color cycle, comprising a first frame of a first primary color, a second frame of a second primary color, and a third frame of a third primary color, completes itself.

19. The system of claim 16, wherein the computing device is further configured to:
convert the first video content item into second color-cycled content, wherein a frame rate of the second color-cycled content is greater than the expected video recording device frame capture rate.

20. The system of claim 16, wherein, to convert the first video content item into color-cycled content, the computing device is further configured to reduce an original color cycle rate of the first video content item to be slower than the expected video recording device frame capture rate.

21. The system of claim 16, wherein, to cause display of the color-cycled content, the computing device is further configured to send, to a display device, the color-cycled content, wherein the color-cycled content comprises blank data in place of first primary color information, second primary color information, or third primary color information.

22. A method comprising:
receiving, by a user device and from a server, metadata indicating that:
a first video content item is to be displayed in a video capture interference mode in which a time period to cycle between frames of a primary color is longer than a frame capture period of a video recording device, and
a second video content item is to be displayed in a video capture non-interference mode;
receiving, by the user device, a selection of the first video content item; and
based on the metadata:
converting, by the user device, the first video content item into color-cycled content, resulting in a failure to complete a full color cycle within the frame capture period; and
causing display of the color-cycled content.

23. The method of claim 22, wherein the metadata indicates a time period associated with the video capture interference mode, and further comprising:
based on determining that a current time falls within the time period, determining, based on the video capture interference mode, one or more parameters of the color-cycled content.

24. The method of claim 22, further comprising:
determining, based on an expected video recording device frame capture rate, a color cycle rate of the video capture interference mode.

* * * * *